United States Patent [19]

Ulug

[11] Patent Number: 4,751,700
[45] Date of Patent: Jun. 14, 1988

[54] METHOD AND APPARATUS FOR LOCAL AREA COMMUNICATION NETWORKS

[75] Inventor: Mehmet E. Ulug, Schenectady, N.Y.

[73] Assignee: General Electric Company, Schenectady, N.Y.

[21] Appl. No.: 938,301

[22] Filed: Dec. 5, 1986

[51] Int. Cl.[4] .............................. H04J 3/02; H04J 3/24
[52] U.S. Cl. .......................................... 370/85; 370/94
[58] Field of Search .................. 370/60, 94, 110.1, 85, 370/86, 89; 340/825.5

[56] References Cited

U.S. PATENT DOCUMENTS

| | | | |
|---|---|---|---|
| 4,516,239 | 5/1985 | Maxemchuk | 370/85 |
| 4,517,670 | 5/1985 | Ulug | 370/85 |
| 4,538,261 | 8/1985 | Kume | 370/85 |
| 4,550,401 | 10/1985 | Spears | 370/85 |
| 4,553,235 | 11/1985 | Svensson | 370/85 |

OTHER PUBLICATIONS

"A Fiber Optic Contention Bus with Bounded Delays", by M. E. Ulug, IEEE Journal on Selected Areas in Communications, vol. SAC-3, No. 6, Nov., 1985, pp. 908-915.

"Preemptive Contention Switch for Interconnecting LANs", by M. E. Ulug, Proceedings of IEEE MONTECH '86, Sep. 29-Oct. 1, 1986, pp. 26-29.

*Primary Examiner*—Douglas W. Olms
*Assistant Examiner*—Frank M. Scutch, III
*Attorney, Agent, or Firm*—Richard V. Burgujian; James C. Davis, Jr.; Paul R. Webb, II

[57] ABSTRACT

A bus accessing method and apparatus for the practice thereof in a communication network is disclosed. The network comprises a transmit bus, a receive bus, a plurality of BIUs connected between the transmit and receive buses and a head-end for directing signals leaving the transmit bus onto the receive bus. Each information packet has two control bytes respectively following the start frame delimiter and preceding the end frame delimiter. Each BIU includes means for comparing the bits it receives with the bits as transmitted thereby, a bit mismatch indicating that a downstream BIU has been preempted. During packet transmission, upon detecting a bit mismatch, the transmitting BIU sets one or both control bytes to "1010" so that receiving BIUs in the network are apprised of the preemption. Subsequently, preempted BIUs transmit their packets in accordance with a predetermined protocol, each packet so transmitted having its control bytes set to "1010". In the case where there are no preempted BIUs, each BIU transmits a packet with the control bytes set to "0101", thereby apprising receiving BIUs that there are no preempted BIUs. Each free mode BIU with a packet to transmit commences transmission substantially immediately following the last transmitted packet if there are no preempted BIUs in the system and the buses are idle.

23 Claims, 3 Drawing Sheets

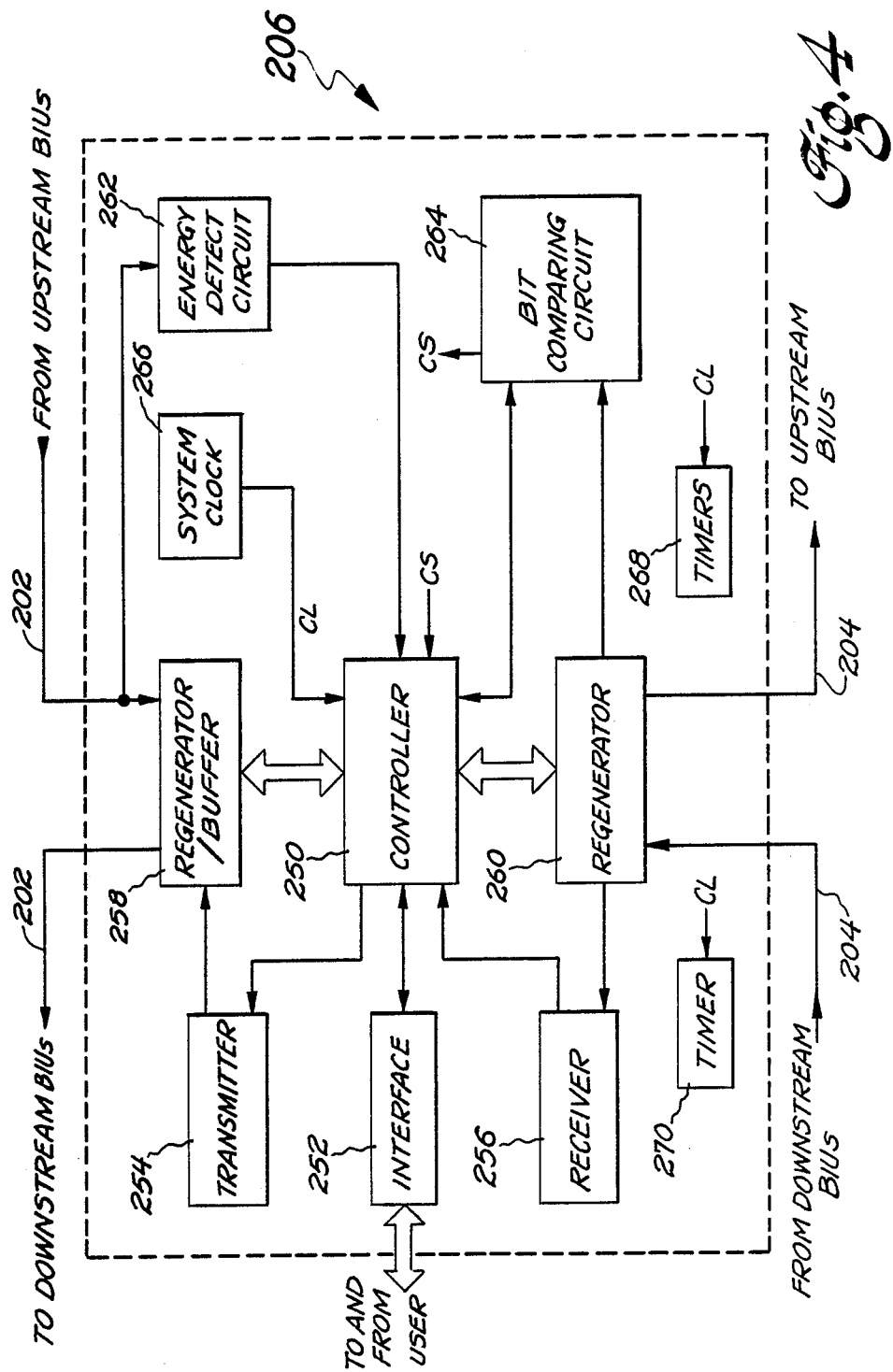

METHOD AND APPARATUS FOR LOCAL AREA COMMUNICATION NETWORKS

The present invention relates in general to local area communication networks (LAN) and, more specifically, to an improved method and apparatus for transmitting message signals in LANs.

BACKGROUND OF THE INVENTION

LANs for communication between various types of computing devices are well known in the art. Such computing devices are connected to the LAN through bus interface units (BIUs), the BIUs operating to transmit and receive information packets for the computing device(s) connected thereto. Protocols of various types, well known in the art, are implemented to enable the various BIUs to access the LAN, in an expedient and efficient manner, for transmitting information packets thereon.

It is therefore a desirable feature of such protocols that they serve to minimize the delay incurred by a BIU in waiting for access to the transmission medium in order to transmit its information packet. The protocol should also serve to maximize the bandwidth of the LAN, i.e. maximize the number of information packets successfully transmitted per unit time.

A contention bus accessing protocol, well known in the art, is one in which, generally, each BIU gains access to the transmission medium of the LAN, in order transmit its information packet, any time the subject BIU determines the medium is idle. When more than one BIU attempts to gain access to the transmission medium, a collision between information packets occurs and each BIU generally discontinues its transmission for a randomly selected time interval, thereafter reattempting to gain access to the medium. Examples of such a control structure are found in LANs following IEEE 802.3 and the Ethernet (a trademark of Xerox Corporation) specifications for a carrier-sense multiple-access (CSMA/CD) protocol. Such protocols generally incur increased delays when many BIUs have information packets to transmit, which results in many collisions occurring. Further, the loss of all information packets involved in each collision has an adverse impact on transmission medium bandwidth. Additionally, since medium access after each collision is determined by a random time factor, it is impossible to establish an upper bound on the interval between times when a BIU can gain access to the medium.

One contention protocol devised to overcome the above described shortcomings is the Preemptive BID (P-BID) Communication system, disclosed in U.S. Pat. No. 4,517,670 and incorporated in its entirety herein by reference. The P-BID protocol is implemented in a bus communication system comprising a transmit bus and a receive bus coupled together through a head-end amplifier. The BIUs are connected in parallel between the buses, each BIU being adapted to detect the presence of signals on the receive bus and signals originating from an upstream direction, away from the head-end, on the transmit bus. In accordance with the protocol, each BIU in a free mode, having an information packet to transmit, monitors the transmit and receive buses of the LAN and if both buses are idle commences transmission of its information packet. If, however, either bus is busy, e.g. an information packet being transmitted by another BIU is detected, the free mode BIU waits until the end of that packet is detected on the receive bus. It then initiates measurement of a communication period having a duration preferably on the order of the two way propagation delay (2T) of the transmission medium. The length of the communication period is selected to assure all BIUs have the opportunity to detect transmissions by all other BIUs in the communication system before gaining access to the transmit bus. If, by the end of the communication period no signals have been detected on the transmit or receive buses, the free mode BIU commences transmission. While transmitting, if the BIU detects upstream originating signals on the transmit bus, it aborts transmission and enters a preempted mode.

Following successful packet transmission by a most upstream transmitting BIU, the preempted mode BIUs detect the end of that successfully transmitted packet, thereupon commencing measurement of a communication period during which each preempted mode BIU transmits a beep. The most upstream preempted mode BIU detects no upstream originating beep and gains access to the transmit bus. BIUs not in the preempted mode upon detecting the beep(s) during the communication period, determine that preempted mode BIUs are attempting to gain access to the bus and defer to those BIUs. Each transmission by a preempted mode BIU is followed by a communication period until all such BIUs have transmitted their information packets. Thus as described above and in the above incorporated U.S. Pat. No. 4,517,670, operation of the P-BID protocol requires at least one communication period following every information packet transmission in order to apprise all BIUs in the system whether the information packets being received were transmitted by BIUs in the free or preempted mode. This need for communication periods can, however, degrade communication system performance at high bit rates. As the hardware available for use in LANs improves and transmission bit rates increase, the length of time required for a BIU to transmit an information packet decreases with respect to the length of the communication period. Since the speed of light is a constant, the two-way propagation delay of the transmission medium remains constant. Therefore, as the bit rate increases and the communication period remains constant in duration, the usable portion of the transmission medium bandwidth decreases. It is therefore desirable to provide a bus accessing protocol with the desirable features of the P-BID protocol in which the adverse effect of the communication period is minimized.

The communication system known as PRENET, described in the paper entitled "A Fiber Optic Contention Bus With Bounded Delays" by M.E. Ulug, IEEE Journal on Selected Areas of Communications, Vol. SAC-3, No. 6, November 1985, incorporated in its entirety herein by reference, when implemented in a two cable configuration, practices the P-BID protocol. In that form of PRENET, each station or BIU includes regenerators through which the transmit and receive buses are respectively looped. Each BIU further includes an energy detector such as provided in the P-BID system, for detecting transmit bus signals originating from an upstream direction away from the head-end which couples the transmit and receive buses together. The PRENET system suffers the same adverse effect on bandwidth caused by the requisite communication periods.

It is therefore an object of the present invention to provide a bus accessing protocol including the desirable features of the P-BID protocol, in which the adverse effect of the communication periods is minimized and that can be implemented in the PRENET two cable system.

SUMMARY OF THE INVENTION

In accordance with the present invention, there is provided a bus accessing method and a communication network for practicing the method. The communication network comprises a transmit bus, a receive bus, means for directing signals leaving the transmit bus onto the receive bus and a plurality of BIUs coupled between the transmit and receive buses. Each BIU is coupled to a user device for which it transmits and receives information packets on the transmit and receive buses, respectively. Each BIU includes means for detecting signals originating from an upstream direction away from the directing means on the transmit bus, means for detecting signals on the receive bus and means for comparing bits received with the bits of an information packet as transmitted thereby. The comparing means provides a collision signal upon detecting a bit mismatch, the mismatch indicating that a downstream BIU has been preempted and entered a preempted mode. Each information packet includes a control portion which when set to a predetermined value, indicates to BIUs receiving the packet on the receive bus that at least one BIU in the system is in the preempted mode. Each BIU includes means for setting the control portion to the predetermined value, indicating a preemption, upon its respective comparing means providing the collision signal.

Each BIU in the preempted mode gains access to the transmit bus in accordance with the predetermined P-BID protocol and transmits its information packet with the control portion set to the predetermined value indicating the preemption. Each BIU receiving a packet on the receive bus, upon determining that the control portion is set, is apprised there is at least one preempted BIU in the system which will gain bus access to transmit its packet, in accordance with the P-BID protocol. In the case where there are no preempted BIUs in the system, each BIU transmitting a packet does so with the control portion not set. Each BIU receiving such a packet is apprised that there are no preempted BIUs in the system. In accordance with the bus access method of the present invention, if there are no preempted BIUs in the system and no signals detected on the transmit and receive buses, a BIU in a free mode and having an information packet to transmit commences transmission of its packet substantially immediately upon detecting on the receive bus the end of the last transmitted packet. As a result, the free mode BIU does not have to wait through a communication period before transmitting, as required by the P-BID protocol, and the usable portion of the transmission medium bandwidth is thereby improved.

In a first illustrated embodiment, BIUs in the communication network are coupled in parallel with one another between the transmit and receive buses. In a second illustrated embodiment, the transmit and receive buses are segmented, each BIU being coupled between a different pair of transmit bus segments and receive bus segments.

BRIEF DESCRIPTION OF THE DRAWINGS

While the specification concludes with claims defining the features of the invention that are regarded as novel, it is believed that the invention, together with further objects thereof, will be better understood from a consideration of the following description in conjunction with the drawing figures, in which:

FIG. 4 is a block diagram of the BIU illustrated in FIG. 3.

DESCRIPTION OF THE INVENTION

Figure 1:
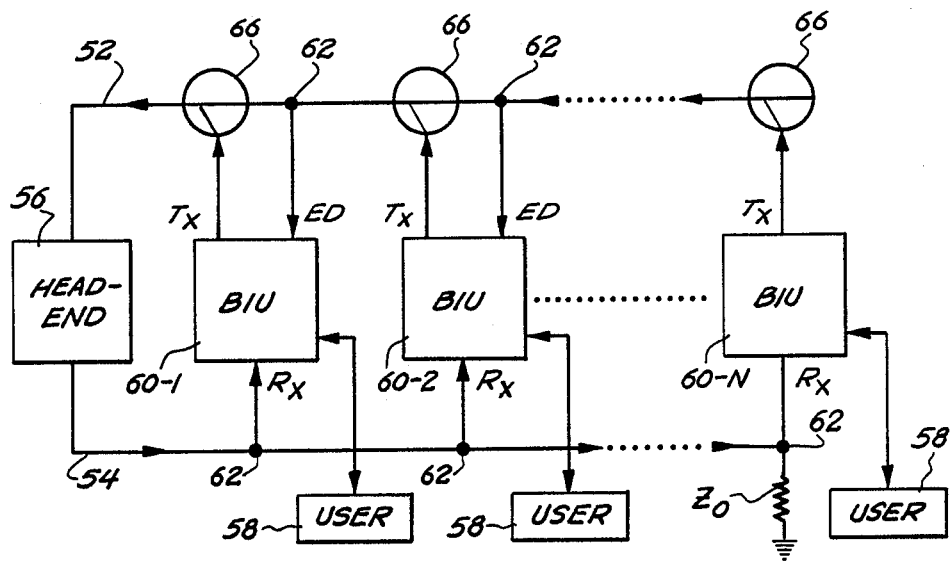
FIG. 1 is a block diagram of a communication network including apparatus which is the subject of the present invention and adapted for practicing the methods which are the subject of the present invention.

Referring now to the drawings, FIG. 1 shows an exemplary communication network 50, constructed in accordance with the above incorporated U.S. Pat. No. 4,517,670, having a form suitable for practicing the P-BID protocol and the protocol of the present invention. Network 50 includes a transmit bus 52 and a receive bus 54, each bus being connected as a serial straight-line topology. A head-end device 56 is provided for receiving transmission signals from transmit bus 52 and directing, by retransmission, these signals onto receive bus 54. Each bus 52 and 54 comprises a transmission medium such as a fiber optic or a coaxial cable and is unidirectional in operation. For example, the transmit and receive buses may each comprise a coaxial cable, as available from Belden Electric and Wire Cable Company, for transmitting AC modulated digital information signals. Alternatively, the buses may comprise high performance fiber optic cable, such as is available from Hewlett Packard Company, part number HFBR3001, for transmitting optical digital information signals. While shown as discrete elements, it will be appreciated by those skilled in the art that the transmit and receive buses may actually comprise the same physical coaxial cable wherein transmission occurs at a first electrical frequency and reception occurs at a second electrical frequency. If necessary, the pair of buses 52 and 54 may be folded upon itself to provide a star or branching tree topology.

Signals on transmit bus 52 propagate in a downstream direction toward head-end 56 while signals on receive bus 54 propagate in an upstream direction away from the head-end. The ends of the transmit and receive buses remote from the head-end may be terminated in a characteristic impedance $Z_o$ when buses 52 and 54 consist of coaxial cables and with a dark surface when the buses consist of fiber optic cables. The buses are so terminated in order to dissipate signals and prevent reflection thereof along the bus.

A plurality of user terminals or data terminal equipment 58 are connected to buses 52 and 54 via a plurality of bus interface units (BIU) 60-1, 60-2, . . . , 60-N (each BIU being generically referred to hereinafter as BIU 60), the BIUs being connected in parallel with one another between buses 52 and 54. The terms upstream and downstream, as used herein with respect to the BIUs, indicate BIU 60-N as being the most upstream and BIU 60-1 being the most downstream. Each BIU 60 may have a plurality of user terminals coupled thereto, typically via ports (not shown) wherein each port of BIU 60 is assigned an identification address. User terminals 58 may be computers, terminals or other devices capable of generating and/or accepting electronic information. Network 50 enables any user terminal 58 to transmit messages to any other user terminal 58.

Each BIU 60 receives messages from the user terminal(s) coupled thereto for transmission to other user terminals and formats the data into information packets. In order to transmit an information packet, the BIU places the packet to be transmitted on transmit bus 52, the protocol or method practiced by each BIU in gaining access to bus 52 for the purpose of transmitting its packet being more fully described below. Information packets are received by each BIU 60 via receive bus 54 after being directed thereon by head-end 56. As described above, head-end 56 is provided for receiving transmissions from the transmit bus and retransmitting this information onto the receive bus. When the transmit and receive buses comprise the same physical cable, head-end 56 may be further adapted to receive signals from transmit bus 52 over a first frequency and retransmit these signals to receive bus 54 over a second frequency. Similarly, where transmit and receive buses comprise separate physical cables, head-end 56 may be adapted to frequency division multiplex the signals by transmitting and receiving over a plurality of different frequencies where the different frequencies correspond to different communication channels to which the BIUs are assigned. Alternatively, where the transmit and receive buses comprise separate physical cables, head-end 56 may simply comprise a repeater or other similar device for receiving and retransmitting signals.

Where buses 52 and 54 consist of coaxial cable, an energy detect port ED and a receive port $R_x$ of each BIU 60 are respectively coupled through couplers 62 to the transmit and receive buses. Couplers 62 are selected to have low insertion loss in the straight through transmission path of each bus. A transmit port $T_x$ of each BIU 60 is coupled to transmit bus 52 through a directional coupler 66. Directional coupler 66 preferably provides the coupling factors described in the U.S. Pat. No. 4,517,670, and, as described therein, prevents an energy detect circuit, of the BIU, coupled to the ED port from responding to transmissions from its associated BIU or further downstream BIUs. Thus the ED port only senses signals transmitted by upstream BIUs. Directional coupler 66 may comprise a CATV tap model DC-12B as available from the Jerrold Electronics Company. Where buses 52 and 54 are constructed of fiber optic cable, each BIU is coupled thereto by passive couplers, such as manufactured by ADC Magnetic Controls Company of Minneapolis, Minn. as a 3 port coupler model PFC. It is noted that the most upstream BIU 60-N requires no ED port since no BIUs are located upstream with respect thereto.

The manner in which user terminal information or data is transmitted from user terminals 58 to their respective BIUs 60, and the method of properly formatting data from information packets as the data are transferred to each user terminal from the BIU associated therewith, are well known in the art and do not form part of the present invention. Accordingly, the specific methods and apparatus for carrying out these transfers will not be described herein. Data as used herein includes digital data, encoded voice and other forms of intelligence which may be transferred between components of the system. An exemplary method for achieving these results may be found in International Standard CCITT X.25. It is assumed that information or data is occasionally transferred from user terminals 58 to their associated BIUs 60 and is formatted for transmission by BIU 60. It is also assumed that information packets received by BIUs 60 are reformatted and the data or voice messages therefrom are transferred to their appropriate associated user terminals.

Figure 2:
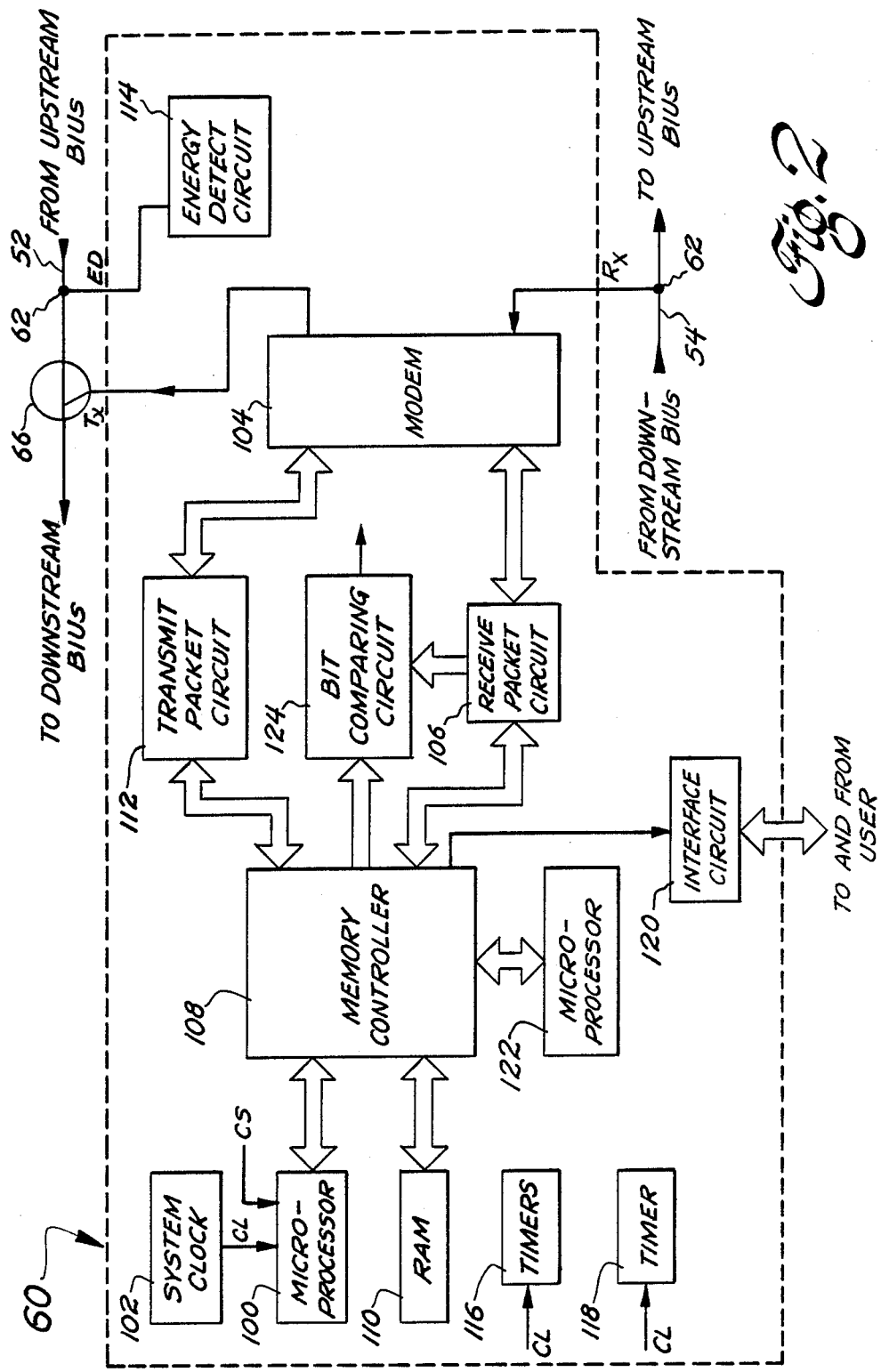
FIG. 2 is a block diagram of the BIU illustrated in FIG. 1.

A preferred BIU 60, illustrated in FIG. 2, is constructed in accordance with the above-incorporated U.S. Pat. No. 4,517,670. The various elements comprising the BIU are illustrated diagrammatically only, in FIG. 2, to the extent necessary to enable description of the protocol of the present invention. It is therefore understood that additional elements, such as described in the last recited patent and required for operation of the BIU, are included therein but not illustrated in FIG. 2. Further, the construction and operation of each element illustrated in FIG. 2 is as described in the U.S. Pat. No. 4,517,670 unless otherwise noted herein.

BIU 60 comprises a microprocessor 100 programmed, by methods and apparatus known in the art, to control the transmission of information packets by the BIU in accordance with the protocol of the present invention. A system clock 102 provides clock signals CL to the microprocessor. A modem 104, coupled to the $T_x$ and $R_x$ ports of the BIU, is provided for transmitting and receiving signals on the transmit and receive buses respectively. Signals received on the receive bus are transferred via a receive packet circuit 106 and memory controller 108 to a random access memory (RAM) 110 for storage therein. Signals being transmitted by the BIU are transferred from the RAM by the memory controller and directed to the modem, for transmission thereby on the transmit bus, by a transmit packet circuit 112.

In addition to the elements described in the above incorporated U.S. Pat. No. 4,517,670, transmit packet circuit 112 additionally includes a control byte register for holding a control byte having a predetermined value. The transmit packet circuit is further adapted to be responsive to a control signal issued by microprocessor 100 to substitute the content of the control byte register into the information packet at specific instances during packet transmission.

An energy detect circuit 114 is coupled to the transmit bus and provides a signal to microprocessor 100 upon detecting upstream originating signals. The BIU further includes a plurality of timers 116 for measuring the various time periods required for practicing the P-BID protocol. An additional timer 118, required for the practice of the protocol of the present invention, measures the signal propagation time from the $T_x$ port to the $R_x$ port of the particular BIU via the transmit and receive buses. Initiating operation of timer 118 upon commencing transmission of an information packet enables the BIU to recognize the initial receipt of its own packet. The operation of each timer is initiated by a command issued by microprocessor 100, each timer providing a signal to that microprocessor upon timing out. Timers 116, 118 are coupled to receive clock signals CL.

User 58 is coupled to RAM 110 through an interface circuit 120 and memory controller 108. A microprocessor 122 controls the formatting into information packets of messages received from the user and storing of the formed packets in the RAM. Similarly, microprocessor 122 formats packets received on the receive bus and addressed to the user, for receipt thereby.

BIU 60 further includes a bit comparing circuit 124 for comparing bits received on the receive bus with those of an information packet transmitted thereby. Circuit 124 is coupled to both memory controller 108 and receive packet circuit 106 in order to receive transmitted and received bytes for comparison. Further, operation of timer 118 enables a determination as to when an information packet transmitted by the subject BIU is being received. Circuit 124 issues a collision signal (CS) to microprocessor 100 upon detecting a mismatch between received and transmitted bytes, such a mismatch indicating that the packet being transmitted by the subject BIU collided with a packet being transmitted by a downstream BIU. Thus, the collision signal also indicates that a packet transmission by a downstream BIU has been preempted.

Bit comparing circuit 124 may be constructed from a plurality of registers and logic means for performing an exclusive-OR logic operation. The received bytes of an information packet are shifted into one register or group of registers while the corresponding bytes as transmitted by the BIU are shifted into a second register or group of registers. The contents of the two registers (or groups thereof) are "exclusive-ORed" with one another. If the register contents match, the logic means provides an output consisting entirely of "0"s. Each bit mismatch will result in a "1" output in response to which the collision signal is generated.

Figure 3:
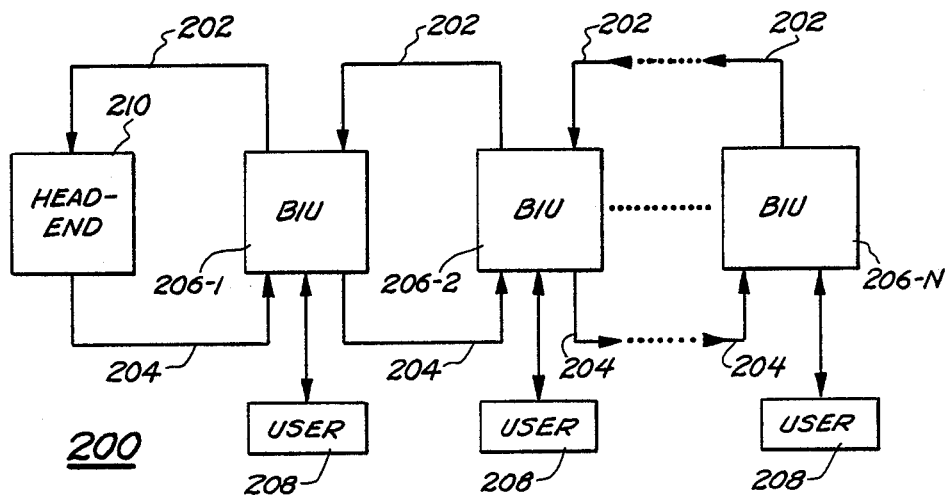
FIG. 3 is a block diagram of a communication network constructed in accordance with an alternate embodiment of the present invention and adapted for practicing the methods of the present invention.

FIG. 3 illustrates an exemplary communication network 200 having a form suitable for the practice of the two cable PRENET protocol and the protocol of the present invention. Network 200 includes a segmented transmit bus 202 and a segmented receive bus 204 each being coupled through a plurality of BIUs 206-1, 206-2, . . . , 206-N (each BIU being generically referred to hereinafter as BIU 206). Thus each BIU is coupled between a different pair of transmit bus segments and receive bus segments. Each BIU transmits and receives information packets for one or more user terminals 208 of the type described above for network 50. As described with respect to network 50, the transmit and receive buses may comprise the same coaxial cable with signal transmission and receipt occurring at first and second electrical frequencies.

The transmit and receive buses may comprise any means for transmitting electrical or fiber optic information signals between the user devices via the BIUs as is known in the art. Thus, as described for network 50, transmit bus 202 and receive bus 204 may each comprise a coaxial cable for transmitting AC modulated digital information signals or high performance fiber optic cable for transmitting optical digital information signals. The availability of these cables is the same as described above for network 50.

Transmit bus 202 is coupled to receive bus 204 via a head-end 210. Head-end 210 is provided for receiving transmissions from the transmit bus and directing this information onto the receive bus. When the transmit and receive buses comprise the same physical cable, head-end 210 may be further adapted to receive signals from the transmit bus at a first frequency and transmit the signals on the receive bus at a second frequency. Alternatively, where the transmit and receive buses comprise separate physical cables, the head-end may comprise a repeater or other similar device for receiving and transmitting signals and need not comprise a frequency translater as described above. In accordance with the terminology used herein, signals propagate in a downstream direction on transmit bus 202 toward head-end 210 and in an upstream direction on receive bus 204 away from the head-end.

BIUs 206-1, 206-2, . . . , 206-N are provided for transmitting information packets for their respective users on transmit bus 202 in accordance with the protocol of the present invention. As discussed above with respect to network 50, the specific methods and apparatus for carrying out the transfer of information between each user 208 and its respective BIU are well known in the art, do not form a part of the present invention and are therefore not described herein. The operation of each BIU 206 may be best described by reference to FIG. 4 wherein a more detailed block diagram of each BIU 206 is provided.

Referring to FIG. 4, each BIU 206 comprises a controller 250 coupled through an interface 252 for communication with its respective user terminal 208 (not shown). Controller 250 comprises any element, or combination of elements, capable of controlling the transfer of information between the user terminal, transmit bus and receive bus. For example, controller 250 may comprise a microprocessor for controlling the transfer of information between user terminal 208 and BIU 206 as well as for controlling the transfer of information between the BIU, the transmit bus and the receive bus. The microprocessor is programmed, by methods and apparatus known in the art, to implement the methods described herein for information transfer between the user terminals via the transmit and receive buses. Controller 100 may additionally comprise read-only memory, random access memory, timers, latches, comparators, bistables and/or monostables, etc., as may be necessary for adapting the microprocessor for such information transfer.

Interface 252 periodically receives information messages from user terminal 208 for transmission on transmit bus 202. The interface performs the function of forming information packets from these messages and storing the packets for later transmission when the BIU gains access to the transmit bus. Similarly, the interface receives, via the controller, information packets received on the receive bus and addressed to the user associated with the BIU, the interface performing the required formatting of received packet(s) for transfer to the user terminal. Interface 252 may comprise any device or combination of devices, e.g. registers, ROM, RAM, microprocessors, etc. for formatting and transferring information.

BIU 206 further includes a transmitter 254 and a receiver 256, each being coupled to controller 250. Transmitter 254 is provided for receiving digital signals from the controller and for preparing the signals for transmission. Hence, the transmitter includes buffer memory and circuitry to add cyclic redundancy check (CRC) bits, add address bits and perform other functions, known in the art, necessary to prepare data for transmission. Receiver 256 is provided for receiving transmitted data and preparing the received data for the controller. Receiver 256 comprises buffer memory and additional circuitry for performing CRC data checks, recognizing and removing address bits, and performing other necessary functions to prepare the received data for the controller. Accordingly, transmitter 254 and receiver 256 may comprise any device or combination of devices adapted for performing the above described data processing functions. It will be apparent to those skilled in the art that while transmitter 254 and receiver 256 are shown as discrete elements in FIG. 4, they can comprise an integrated transceiver device for performing the functions described above.

Controller 250 and transmitter 254 are both coupled to a regenerator/buffer 258. Regenerator/buffer 258 is further coupled to transmit bus 202 for receiving incoming message signals from an upstream BIU and transmitting these incoming message signals to a downstream BIU via the transmit bus. Controller 250 and receiver 256 are both coupled to a regenerator 260. Regenerator 260 is further coupled to receive bus 204 for receiving message signals from the downstream BIU and transmitting these message signals to the upstream BIU via the receive bus. The coupling of each regenerator 258, 260 to the controller enables the controller to monitor the content of information packets being received and transmitted on both buses. Each regenerator 258, 260 is adapted for reconstructing each data bit so that bits degraded upon reception are reconstructed before being transmitted. Circuitry for performing such reconstruction is well known in the art.

Regenerators 258, 260 may each comprise a receiver and a transmitter for respectively receiving from and transmitting signals to its respective bus. For example, the regenerators may each comprise a model 30-0078-3 modem as available from the Computrol Corporation for receiving and transmitting AC modulated digital signals. Alternatively, where the transmit and receive buses comprise fiber optic cable, the regenerators may comprise a high speed transmitter model number HFBR-1001 and a high speed receiver model number HFBR-2001, available from the Hewlett Packard Company.

Regenerator/buffer 258 additionally includes a control byte register for holding a control byte having a predetermined value. Regenerator/buffer 258 is adapted to be responsive to controller 250 to substitute the content of the control byte register into specific portions of an information packet being transmitted by the BIU. The regenerator/buffer further includes a buffer memory in which a portion of an incoming information packet, being received on the transmit bus, can be temporarily stored.

Controller 250 is also coupled to an energy detect circuit 262, such as described in the above incorporated U.S. Pat. No. 4,517,670, which provides an energy detect signal to the controller upon detecting the presence of signals on the transmit bus. Since the energy detect circuit is coupled to the incoming portion of transmit bus 202, the energy detect signal provided thereby indicates the subject BIU is receiving, on the transmit bus, transmissions originating from a BIU located upstream with respect to the subject BIU.

BIU 206 additionally includes a bit comparing circuit 264 substantially identical in construction and operation to the above described circuit 124 in BIU 60. Circuit 264 is coupled to controller 250 and regenerator 260 in order to respectively receive transmitted and received bytes for comparison. The controller is further coupled to receive the collision signal (CS) provided by the bit comparing circuit.

BIU 206 further includes a system clock 266 which provides clock signals CL to the controller and to a plurality of timers 268 and 270. Timers 268 include those required for measuring the various time periods required for practicing the P-BID protocol. Timer 270, required for the practice of the protocol of the present invention, serves the same purpose as timer 118 in BIU 60. Timer 270 measures the time for a signal transmitted by the subject BIU to propagate down the transmit bus, be directed onto the receive bus by the head-end and propagate up the receive bus back to the subject BIU. The operation of timer 270 enables a determination as to when an information packet transmitted by the subject BIU is initially being received, this information being required for operation of the bit comparing circuit.

A two cable PRENET network, such as illustrated in FIG. 3, is, as discussed above, generally operated in accordance with the P-BID protocol. Such operation of the PRENET network differs from the operation of the network illustrated in FIG. 1 and illustrated and described in the above incorporated U.S. Pat. No. 4,517,670, in the ability of each BIU to buffer an incoming preempting information packet while it ceases transmission of its own packet in response thereto. Thus, there are no collisions per se in the PRENET system. There is, however, a delay in the propagation of the upstream originating information packet caused by holding, in the buffer of regenerator/buffer 258, the received portion of that packet while the preempted BIU ceases transmission.

The protocol of the present invention is a modification to and improvement of the P-BID protocol. As in P-BID, BIUs may operate in a free, captive or preempted mode. In the free mode, a BIU having an information packet to transmit, gains access to the transmit bus when the buses are idle and ceases transmission upon detecting a preempting upstream originating transmission, in the manner prescribed by P-BID. Preempted BIUs gain access to the transmit bus by transmitting beeps during recurring communication periods, as in P-BID. Further, BIUs that have successfully transmitted a packet enter the captive mode, as in P-BID. However, unlike P-BID, the protocol of the present invention obviates the need for a communication period to follow every packet transmission when there are no preempted BIUs in the network.

In accordance with the protocol of the present invention, each BIU in a free mode and having commenced transmission, compares the bits of its packet it is receiving on the receive bus, with the bits as transmitted thereby. In the absence of any preemption of downstream BIUs that were transmitting and ceased upon detecting the packet being transmitted by the subject BIU, the received bits of the information packet will match identically with the bits as transmitted. However, if a preemption did occur, there will be a mismatch between the received and transmitted bits. In the case of network 50, the mismatch will result from actual damage to the packet caused by a collision between the packet preamble transmitted by the subject BIU and the packet being transmitted by a downstream BIU. In the case of network 200, there are, as noted above, no collisions. However, the delay resulting from the buffering of the packet being transmitted by the subject BIU, upon its preempting the transmission of a downstream BIU, will result in a bit mismatch. Thus, upon detecting a mismatch, i.e. the bit comparing circuit providing a collision signal, the transmitting BIU determines that preemption of a downstream BIU has occurred.

It is noted that the protocol of the present invention requires, as in the P-BID protocol, that the preamble of an information packet have a length sufficient to fill the transmit and receive buses. Preemptions therefore occur during the preamble of the preempting packet. As a result, in the case of either networks 50 or 200, bit mismatches will be initially detected in the preamble portion of the packet.

As a further feature of the present invention, the information packet transmitted by BIUs includes two control portions in the form of a first and a second control byte respectively following the start frame delimiter and preceding the end frame delimiter of the packet. As is well known in the art, the start frame delimiter follows the packet preamble and the end frame delimiter precedes the end of message indicator. The first four bits of each control byte consists of "1010" or "0101" if at least one BIU in the network respectively has or has not been preempted. The second four bits of each control byte are the forward error detecting and correcting codes of the first four bits.

Thus, a BIU in the free mode transmits an information packet in which the first four bits of both control bytes are set to "0101". However, upon determining that a downstream preemption has occurred, as indicated by the collision signal, the BIU changes one or both control bytes to "1010". If the first control byte has not yet been transmitted upon receiving the collision signal, both control bytes will be set to "1010". If, however, the first control byte has already been transmitted, only the second control byte will be set to "1010".

In BIUs 60 and 206, the control bytes are respectively set under control of microprocessor 100 and controller 250. In the absence of a collision signal and assuming the BIU is not operating in the preempted mode, the microprocessor or controller takes no special action and control byte values default to "0101" settings. The control byte registers in transmit circuit 112 (BIU 60) and in regenerator/buffer 258 (BIU 206) each hold a control byte set to "1010". Thus, upon receiving a collision signal or operating in the preempted mode, microprocessor 100 or controller 250 causes the contents of its respective control byte register to be transmitted at the appropriate positions of one or both control bytes in the information packet.

All BIUs in the network receive the transmitted information packet on the receive bus and note the setting of the control bytes. If one or both control bytes are set to "1010", then the receiving BIUs are apprised that at least one BIU has been preempted and will subsequently attempt to gain access to the bus upon completion of transmission by the preempting BIU. Bus access is contended for by preempted BIUs by using communication periods and transmitting beeps, as described above for the P-BID protocol. Each preempted mode BIU, upon gaining access to the bus and transmitting its packet, sets both control bytes in the packet to "1010". As a result, as long as there are BIUs in the preempted mode, all BIUs in the system will note this by observing the control byte settings of packets they receive on the receive bus.

Upon receiving an information packet in which both control bytes are set to "0101", the receiving BIU is apprised that there are no preempted mode BIUs in the network, i.e. all BIUs are either in the free or captive mode. As a result, upon detecting the end of the received packet, a free mode BIU with a packet to transmit determines whether both buses are idle and, if so, substantially immediately commences transmitting its information packet. There is no need for measurement of a communication period following receipt of the end of the previously transmitted packet, as is required by the P-BID protocol. As described above, the communication periods are provided in the P-BID protocol to enable BIUs in the network to determine whether any BIUs are in the preempted mode, even when there are no preempted mode BIUs. The protocol of the present invention eliminates the communication periods so long as no BIUs are in the preempted mode and instead provides the network BIUs with information about the other BIUs via the control bytes in each information packet.

As an additional feature of the present invention, hardware and software malfunctions can be detected. The particular situation of interest is one in which a preempted BIU is transmitting its packet and detects an upstream originating signal (via its energy detect circuit). The preempted BIU ceases transmission and reads, upon receipt on the receive bus, the first control byte of the upstream packet. If that byte is set to "0101", it indicates that the upstream transmitting BIU is malfunctioning since it is transmitting in a free mode while a preempted BIU has access to the bus. Upon making the determination that the upstream BIU has malfunctioned, the preempted BIU jams the transmit bus for a period equal to. the communication period. The jamming results in the malfunctioning BIU detecting bit mismatches in the data portion (following the preamble) of its packet. As stated above, in normal operation bit mismatches should only occur during the preamble portion of a packet. Thus, mismatch occurrence during the packet data portion serves to indicate to the transmitting BIU that it is malfunctioning. In accordance with this further feature of the present invention, microprocessor 100 (BIU 60) and controller 250 (BIU 206) are programmed to cease transmitting, upon detecting a bit mismatch during the packet data portion, and refrain from transmitting until the preempted BIU(s) has transmitted its information packet.

In accordance with yet another feature of the present invention, the adverse effect of bit mismatches resulting from noise on the bus can be minimized. Bit mismatches resulting from noise that occurs in the packet preamble cannot be overcome. Such mismatches result in inappropriate entry into a preempted mode and lost transmission time equal to one communication period. However, adverse effects resulting from noise generated mismatches occurring subsequent to the preamble can be obviated by gating the bit comparing circuit so that it only functions during receipt of the packet preamble and an initial portion of the packet data portion. The initial portion of the packet data portion need only be long enough to enable detection of jamming by a downstream BIU, as occurs when a BIU malfunctions, as described above. Circuitry for effecting such gating is well known in the art.

While the illustrated embodiment of the present invention has been described including an information packet having two control portions, the invention is not so limited. The invention can be practiced, with equal effectiveness, using an information packet having only one control portion located either following the start frame delimiter or preceding the end frame delimiter.

Though the control bytes, of the information packet described above, are set to "1010" or "0101" to indicate preemption or no preemption, respectively, these values are purely arbitrary. Any predetermined values can be employed for the control bytes to indicate preemption or no preemption. Further, while each control portion consists of an eight bit byte, each control portion could be chosen to be longer or shorter without having any significant effect on the practice of the present invention.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for transmitting information packets in a communication network comprising a transmit bus, a receive bus and means for directing information packets leaving said transmit bus onto said receive bus, a plurality of bus interface units (BIUs) each coupled between said transmit and receive buses and to a user device for which it transmits and receives information packets, each said BIU including means for detecting on said transmit bus signals originating from an upstream direction away from said directing means, said method comprising the steps of:

(1) comparing bits of an information packet transmitted by a transmitting BIU as received thereby on said receive bus with the bits of said information packet as transmitted thereby;
   (2) determining, upon detecting a mismatch between the received and transmitted bits, that at least one BIU located downstream with respect to said transmitting BIU has been preempted and entered a preempted mode;
   (3) setting to a predetermined value a control portion of said information packet being transmitted upon determining that the preemption has occurred, said control portion predetermined value being effective to indicate to BIUs receiving the last recited packet that the preemption has occurred;
   (4) allowing each BIU in said preempted mode to transmit its respective information packet before any information packets are transmitted by BIUs in a free mode following completion of transmission by said transmitting BIU, each BIU in said preempted mode transmitting said information packet having said control portion set to said predetermined value; and
   (5) commencing transmission at each BIU in said free mode and having an information packet to transmit substantially immediately upon detecting the end of a last transmitted information packet on said receive but if said control portion of said last transmitted packet is not set to said predetermined value and said transmit and receive buses are idle.

2. The method of claim 1 including the additional steps of:
   monitoring said transmit bus for the presence of said upstream signals while said transmitting BIU transmits said information packet; and
   ceasing transmission by said transmitting BIU if said upstream signals are detected so that the information packet transmission by the last recited BIU is preempted.

3. The method of claim 1 wherein said information packet includes first and second ones of said control portion, said first control portion following a start frame delimiter of said information packet, said second control portion preceding an end frame delimiter of said information packet; and
   step (3) of said method further comprising said transmitting BIU setting only said second control portion or both said first and second control portions if said first control portion respectively has or has not been transmitted upon said transmitting BIU determining that preemption has occurred.

4. The method of claim 3 wherein each preempted BIU transmits its respective information packet with both said first and second control portions set to said predetermined value.

5. The method of claim 1 wherein said BIUs are coupled in parallel between said transmit and receive buses.

6. The method of claim 1 wherein said transmit and receive buses each comprise a plurality of bus segments, each said BIU being coupled between a different pair of transmit bus segments and receive bus segments.

7. The method of claim 1 including the additional steps of:
   ceasing information packet transmission from said BIU in said preempted mode upon detecting signals on said transmit bus comprising an upstream originating information packet;
   reading said control portion of said upstream packet;
   jamming said transmit bus for a predetermined period if said control portion of said upstream packet is not set to said predetermined value, said predetermined period being of sufficient duration to cause bit mismatches to be detected during a data portion of said upstream packet at an upstream BIU transmitting said upstream packet;
   ceasing transmission from said upstream BIU upon there detecting bit mismatches during the data portion of said upstream packet; and
   refraining from transmitting from said upstream BIU until each said BIU in said preempted mode successfully transmits its information packet.

8. A bus communication network, comprising:
   a transmit bus;
   a receive bus;
   means for directing signals leaving said transmit bus onto said receive bus;
   a plurality of bus interface units (BIUs) respectively coupled between said transmit and receive buses at locations spaced therealong, said BIUs communicating with each other by transmitting signals on said transmit bus and receiving signals on said receive bus, each said BIU being coupled to a user device for which it both transmits and receives information packets;
   each said BIU including:
      means for detecting signals on said transmit bus originating from an upstream direction away from said directing means;
      means for detecting signals on said receive bus;
      means for comparing bits as received of an information packet transmitted thereby with the bits of said information packet as transmitted thereby, said comparing means providing a collision signal upon detecting a mismatch between the received and transmitted bits of said packet, the bit mismatch indicating that a downstream BIU has been preempted and entered a preempted mode;
      means for setting to a predetermined value a control portion of said packet being transmitted upon said comparing means providing said collision signal;

each BIU in said preempted mode gaining access to said transmit bus in accordance with a predetermined protocol and transmitting its information packet with said control portion set to said predetermined value;

each said BIU adapted to monitor said control portion of each said packet on said receive bus, so that upon detecting on said receive bus an information packet in which said control portion is not set to said predetermined value each said BIU is apprised there are no preempted BIUs in said network; and each said BIU in a free mode and having an information packet to transmit adapted to commence transmission of its packet substantially immediately upon detecting on said receive bus the end of a last transmitted information packet if there are no preempted BIUs in said network and said BIU detects no signals on said transmit and receive buses.

9. The bus communication network of claim 8 wherein each said BIU is further adapted, upon detecting said upstream originating signals on said transmit bus, to cease transmission of its information packet and enter said preempted mode.

10. The bus communication network of claim 8 wherein said information packet includes first and second ones of said control portion, said first control portion following a start frame delimiter of said packet, said second control portion preceding an end frame delimiter of said packet; and said BIU adapted to set only said second control portion or both said first and second control portions if said first control portion respectively has or has not been transmitted upon said comparing means providing said collision signal.

11. The bus communication network of claim 10 wherein each said BIU in said preempted mode upon gaining access to said transmit bus is adapted to transmit its information packet with both said first and second control portions set to said predetermined value.

12. The bus communication network of claim 8 wherein said BIUs are coupled in parallel between said transmit and receive buses.

13. The bus communication network of claim 8 wherein said transmit and receive buses each comprise a plurality of segments, each said BIU being coupled between a different pair of transmit bus segments and receive bus segments.

14. The bus communication network of claim 8, said comparing means including timer means for measuring a packet time period having a duration substantially equal to the time for a signal to propagate from a transmit port of said BIU to a receive port thereof, so that by initiating operation of said timer means upon commencing transmission of said information packet, said timer means times out substantially when the transmitted packet is initially being received and bit comparison is to commence.

15. The bus communication network of claim 8 wherein said BIU is adapted, upon said comparing means detecting a bit mismatch during a data portion of said packet, to cease information packet transmission and refrain from further transmission until each said BIU in said preempted mode completes transmission of its information packet; and said BIU, while in said preempted mode and transmitting its information packet, being further adapted to cease transmission upon detecting signals on said transmit bus comprising an upstream originating information packet, said BIU in said preempted mode jamming said transmit bus for a predetermined period if said control portion of said upstream packet is not set to said predetermined value, said predetermined period having a duration sufficient to cause bit mismatches to be detected during the data portion of said upstream packet at an upstream BIU transmitting said upstream packet.

16. A bus interface unit (BIU) for a bus communication network, said network including a transmit bus and a receive bus for the propagation of signals thereon and means for directing signals leaving said transmit bus onto said receive bus, said network further including a plurality of said BIUs respectively coupled between said transmit and receive buses, each said BIU including:

means for transmitting signals on said transmit bus;

means for receiving signals on said receive bus, said BIU being coupled to a user device for which it both transmits and receives information packets;

means for detecting signals on said transmit bus originating from an upstream direction away from said directing means;

means for detecting signals on said receive bus;

means for comparing bits received with the bits of an information packet as transmitted thereby, said comparing means providing a collision signal upon detecting a mismatch between the received and transmitted bits of said packet, the bit mismatch indicating that a downstream BIU has been preempted and entered a preempted mode;

means for setting to a predetermined value a control portion of said packet being transmitted upon said comparing means providing said collision signal;

each BIU in said preempted mode gaining access to said transmit bus in accordance with a predetermined protocol and transmitting its information packet with said control portion set to said predetermined value;

each said BIU adapted to monitor said control portion of each said packet on said receive bus, so that upon detecting on said receive bus an information packet in which said control portion is not set to said predetermined value each said BIU is apprised there are no preempted BIUs in said network; and each said BIU in a free mode and having an information packet to transmit adapted to commence transmission of its packet substantially immediately upon detecting on said receive bus the end of a last transmitted information packet if there are no preempted BIUs in said network and said BIU detects no signals on said transmit and receive buses.

17. The BIU of claim 16 further adapted, upon detecting said upstream originating signals on said transmit bus, to cease transmission of its information packet and enter said preempted mode.

18. The BIU of claim 16 wherein said information packet includes first and second ones of said control portion, said first control portion following a start frame delimiter of said packet, said second control portion preceding an end frame delimiter of said packet; and said BIU adapted to set only said second control portion or both said first and second control portions if said first control portion respectively has or has not been transmitted upon said comparing means providing said collision signal.

19. The BIU of claim 18 wherein each said BIU in said preempted mode upon gaining access to said transmit bus is adapted to transmit its information packet with both said first and second control portions set to said predetermined value.

20. The BIU of claim 16, said comparing means including timer means for measuring a packet time period having a duration substantially equal to the time for a signal to propagate from a transmit port of said BIU to a receive port thereof, so that by initiating operation of said timer means upon commencing transmission of said information packet, said timer means times out substantially when the transmitted packet is initially being received and bit comparison is to commence.

21. The BIU of claim 16 wherein said BIUs in said network are coupled in parallel with one another between said transmit and receive buses.

22. The BIU of claim 16 wherein said transmit and receive buses of said network each comprise a plurality of segments, each said BIU being coupled between a different pair of transmit bus segments and receive bus segments.

23. The BIU of claim 16 adapted, upon said comparing means detecting a bit mismatch during a data portion of said packet, to cease information packet transmission and refrain from further transmission until BIUs in said preempted mode complete transmission of their respective information packets; and said BIU, while in said preempted mode and transmitting its information packet, being further adapted to cease transmission upon detecting signals on said transmit bus comprising an upstream originating information packet, said BIU in said preempted mode jamming said transmit bus for a predetermined period if said control portion of said upstream packet is not set to said predetermined value, said predetermined period having a duration sufficient to cause bit mismatches to be detected in the data portion of said upstream packet at an upstream BIU transmitting said upstream packet.

* * * * *